(12) United States Patent
Burns et al.

(10) Patent No.: US 6,917,942 B1
(45) Date of Patent: Jul. 12, 2005

(54) SYSTEM FOR DYNAMICALLY EVALUATING LOCKS IN A DISTRIBUTED DATA STORAGE SYSTEM

(75) Inventors: Randal Chilton Burns, Sunnyvale, CA (US); Robert Michael Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 09/526,155

(22) Filed: Mar. 15, 2000

(51) Int. Cl.[7] .............................................. G06F 17/00
(52) U.S. Cl. ..................................................... 707/100
(58) Field of Search .......................... 707/8, 10, 9, 100, 707/201, 203, 200, 163

(56) References Cited

U.S. PATENT DOCUMENTS

| | | | |
|---|---|---|---|
| 5,339,427 A | 8/1994 | Elko et al. ................... 395/725 |
| 5,388,266 A | * 2/1995 | Frey et al. ................... 711/121 |
| 5,454,108 A | 9/1995 | Devarakonda et al. ...... 395/650 |
| 5,535,375 A | 7/1996 | Eshel et al. .................. 391/500 |
| 5,551,046 A | 8/1996 | Mohan et al. ............... 395/800 |
| 5,745,747 A | 4/1998 | Chang et al. ................ 395/608 |
| 5,848,241 A | 12/1998 | Misinai et al. ......... 395/200.43 |

* cited by examiner

Primary Examiner—Safet Metjahic
Assistant Examiner—Sana Al-Hashemi
(74) Attorney, Agent, or Firm—John L. Rogitz

(57) ABSTRACT

A system and method for managing access to assets in a distributed data storage system includes requesting, from a client computer, a lock from a server computer. The lock is evaluated using a bitwise comparison of the protected access modes and restricted access modes defined by the lock with the protected and restricted modes defined by the currently outstanding locks using an algorithm, such that a potentially large compatibility table is not needed.

18 Claims, 3 Drawing Sheets

EVALUATE
LOCK
REQUEST
(SERVER)

GRANT
LOCK
(SERVER)

PROCESS LOCAL LOCK REQUEST (CLIENT)

PROCESS SERVER DEMAND (CLIENT)

SYSTEM FOR DYNAMICALLY EVALUATING LOCKS IN A DISTRIBUTED DATA STORAGE SYSTEM

BACKGROUND OF THE INVENTION

1. Field of the Invention

The present invention relates to managing locks to assets in distributed data storage systems such as file systems and databases.

2. Description of the Related Art

Distributed file systems are used to provide data sharing in distributed computer systems. Such systems centralize data storage, which improves the scalability and manageability of data access control. Moreover, centralized data storage also facilitates, among other things, easier storage device replacement and data backups, as compared to systems in which data storage is fragmented among local storage devices of many computers. It is to be understood that while, for disclosure purposes, the present discussion focuses on file systems, the principles set forth herein apply equally to other distributed data storage systems, such as distributed database systems.

To synchronize data access such that users share consistent views of shared data, requests from users to read and write data typically are sent to a central file server. The file server then manages access to the data using "locks" to ensure, e.g., that one user is not updating shared data by writing to it while another user might read an out-of-date version of the same data. Thus, users use locks to synchronize access to a distributed resource, and a lock comes with a guarantee as the actions the user can take under that lock and the actions that the lock prohibits other users from performing.

Two main components of locking schemes exist, namely, the locking mode (defining what actions that a lock permits and prevents) and locking protocol (defining who holds a lock, how it is granted, and how it is ceded back). The present invention is directed to methods for dynamically determining lock compatibility in systems using preemptible lock protocols, non-preemptible lock protocols, and most preferably the semi-preemptible lock protocol disclosed in related IBM case no. AM9-99-0079.

Heretofore, to determine whether a requested lock is compatible with outstanding locks, lock compatibility tables have been used. Essentially, a lock compatibility table is a matrix which can be accessed which indicates, for each type of lock, what other locks are compatible with it. As recognized by the present invention, when many combinations of locks are possible the compatibility tables can become excessively large because the size of the table grows with the square of the number of locks. The present invention has recognized the inherent scalability problem of compatibility tables and has provided the solutions noted below.

SUMMARY OF THE INVENTION

A general purpose computer is programmed according to the inventive steps herein to dynamically evaluate lock compatibility in a distributed storage system. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including at least one general purpose client computer, at least one general purpose server computer, and a distributed data storage system accessible to at least the client computer. The system also includes logic that can be executed by the client computer for undertaking method acts to dynamically evaluate lock compatibility. The method acts undertaken by the client computer include determining whether to grant a system access lock without using a lock compatibility table, with the access lock pertaining to at least one asset in the storage system.

The preferred system uses at least one algorithm, preferably an equation, that is executed to determine lock compatibility. The preferred algorithm is based on respective sets of access privileges granted by at least two locks, and on respective sets of sharing privileges restricted by the two locks. More specifically, a summary string of outstanding locks is accessed, with the summary string defining a first set $P_S$ of protected access modes and a first set $D_S$ of restricted access modes, and with the requested lock defining a second set $P_R$ of protected access modes and a second set $D_R$ of restricted access modes. The algorithm determines whether the intersection of at least one of: the first set $P_S$ of protected access modes and second set $D_R$ of restricted access modes, and the second set $P_R$ of protected access modes and first set $D_S$ of restricted access modes. More specifically still, the requested lock is granted if $(P_R \cap D_S=0) \wedge (D_R \cap P_S=0)$. If desired, an upgrade lock can be determined that is represented by a union of outstanding and requested protected modes and outstanding and requested restricted modes.

In another aspect, a computer system includes at least one general purpose server computer, at least first and second general purpose client computers, and a distributed data storage system accessible to at least the client computers. Logic is executable by the server computer for undertaking method acts to manage access to assets in the storage system. These method acts include receiving a request for a first access lock from the first client computer, and determining at least whether the first lock is compatible with a second lock associated with the second client computer based on a bitwise evaluation of respective first and second sets of access privileges and sharing privileges associated with the first and second locks. The request is granted if the first lock is compatible with the second lock. Otherwise, the second lock is demanded.

In yet another aspect, a computer program device is disclosed that includes a program of instructions for evaluating a request for a requested lock. The program includes computer readable code means for determining whether to grant the requested lock without using a lock compatibility table, the requested lock pertaining to at least one asset in the storage system.

In still another aspect, a computer-implemented method is disclosed for managing access among plural client computers to assets in a distributed data storage system associated with at least one server computer. The method includes issuing locks to client computers, with the locks being conditions precedent for the grant of a file lock to open a file. The locks are relinquished upon demand of the server computer when no associated file lock is invoked. The issuing act is based on at least one of: first and second sets of access privileges pertaining to first and second locks, respectively, and first and second sets of sharing privileges restricted by the first and second locks, respectively.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
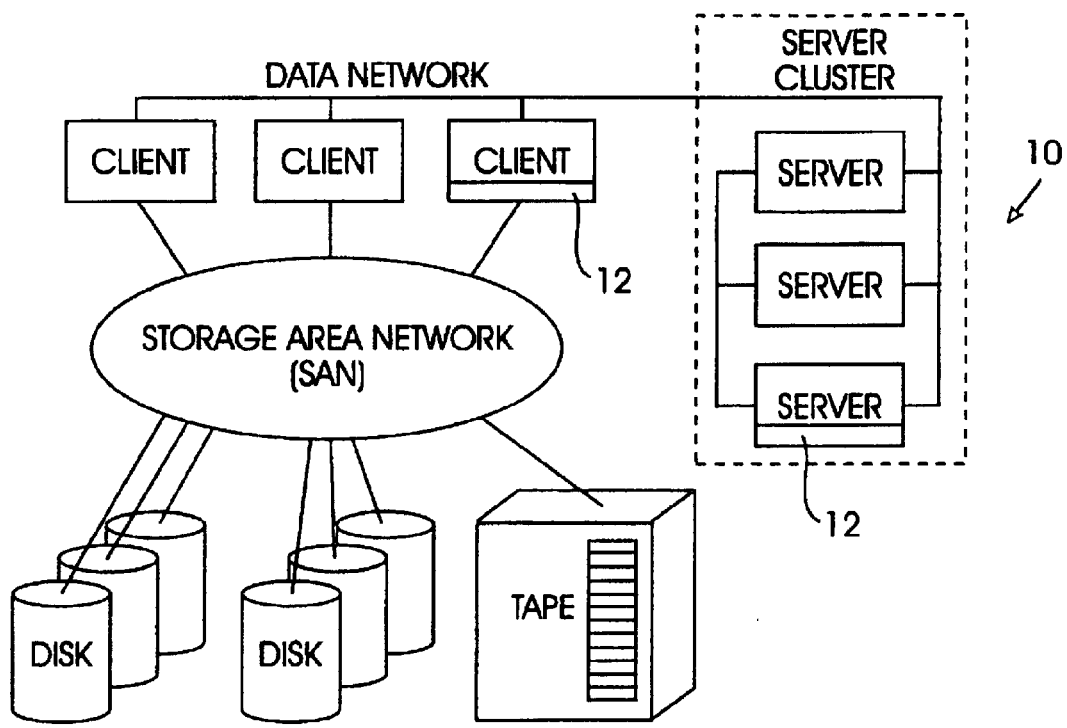
FIG. 1 is a schematic diagram showing the system of the present invention.

Referring initially to FIG. 1, a system is shown, generally designated 10, for managing data access in a distributed data storage system, such as a storage area network (SAN) having associated client computers and at least one server computer. As shown, the system 10 can include a cluster of server computers, and the network can include plural storage disks and tapes and other storage devices. One or more of the disks can be "local" to a client computer, i.e., the client computer manages one or more disks as though the disks were local to the client computer.

In one intended embodiment, the computers of the present invention may be personal computers made by International Business Machines Corporation (IBM) of Armonk, N.Y., or the computers may be any computer, including computers sold under trademarks such as AS400, with accompanying IBM Network Stations. Or, the computers may be Unix computers, or OS/2 servers or Windows NT servers, or IBM workstations or IBM laptop computers.

The flow charts herein illustrate the structure of the logic executed by the computers of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the flow charts may be embodied in a computer program that is executed by a processor within the computers as a series of computer-executable instructions. These instructions may reside, for example, in a program storage device 12 of the computers. The program storage device 12 may be RAM of the computers, or a magnetic or optical disk or diskette, DASD array, magnetic tape, electronic read-only memory, or other appropriate data storage device. In an illustrative embodiment of the invention, the computer-executable instructions may be lines of compiled C⁻⁻ compatible code.

To better understand the flow charts described below that illustrate the present invention, reference is first made to FIG. 2. As a preferred but non-limiting example of the types of data structures that can be used in the present invention, attention is now directed to FIG. 2, which shows a preferred data structure 14 for evaluating lock requests without iteration. Sharing restrictions and protected access modes are summarized in binary form in a summary string 16. The data 20 structure 14 also allows the server to find all locks that must be demanded, without searching, and the structure 14 does not asymptotically increase the space cost. The summary string 16 advantageously makes provision for locks that are compatible yet not strength-related, and operates correctly even when outstanding locks exist that cannot be represented by a single lock.

Additionally, the structure 14 further includes a list 18 of outstanding locks for facilitating calculation of the summary string 16. A respective bit vector 20 represents each lock. For a locking system with "k" unique access modes, each bit vector 20 contains 2 k bits. The first "k" bits correspond to the set of protected access modes "$P_i$", i=1, . . . ,k that the lock protects, with a "1" indicating that the access mode represented by the bit position is protected, whereas the second "k" bits correspond to the set of restricted access modes "$D_i$", i=1, . . . ,k that the lock does not permit to be concurrently held, with a "I" indicating that no other lock can protect the mode represented by the bit position.

Each bit vector 20 has an associated lock identifier 22 that is used in processing lock requests. If desired, the lock identifiers 22 can be maintained using extendible hashing for scalability and fast lookup. In any case, it may now be appreciated that the summary string 16 is the union of all protected access modes and the union of all prohibited concurrently held modes as defined by the bit strings 20 in the list 18. Accordingly, a requested lock $L_R$ is compatible with all outstanding locks in the list 18 if it shares all modes protected by the summary string 16 and the summary string 16 shares all modes the requested lock protects, i.e., a requested lock $L_R$=<$P_R$, $D_R$> is compatible with the summary string 16=<$P_S$, $D_S$> representing outstanding locks iff ($P_R \cap D_S$=0)$\wedge$($D_R \cap P_S$=0), equivalently ($P_R \wedge D_S$)$\vee$($P_S \wedge D_R$) =0, wherein $\cap$ is the intersection operator, $\wedge$ is the logical "and" operator, and $\vee$ is the logical "or" operator.

In addition to the list 18 and summary string 16, the structure 14 includes a bitlock list 24 to aid in processing lock requests and efficiently maintaining the summary. For each bit in the summary string 16, the bitlocks list 24 contains a list of the locks (by identifiers 22) in the outstanding list 18 that set that bit high. The bitlocks list 24 is used to determine which locks must be demanded when a requested lock is not compatible with the current lock state. Also, each lock in the outstanding list 18 points to locations in the bitlocks list 24 in which the lock appears, such that when a lock is released, the pointers are used to quickly unlist the lock from the bitlocks list 24.

Figure 3:
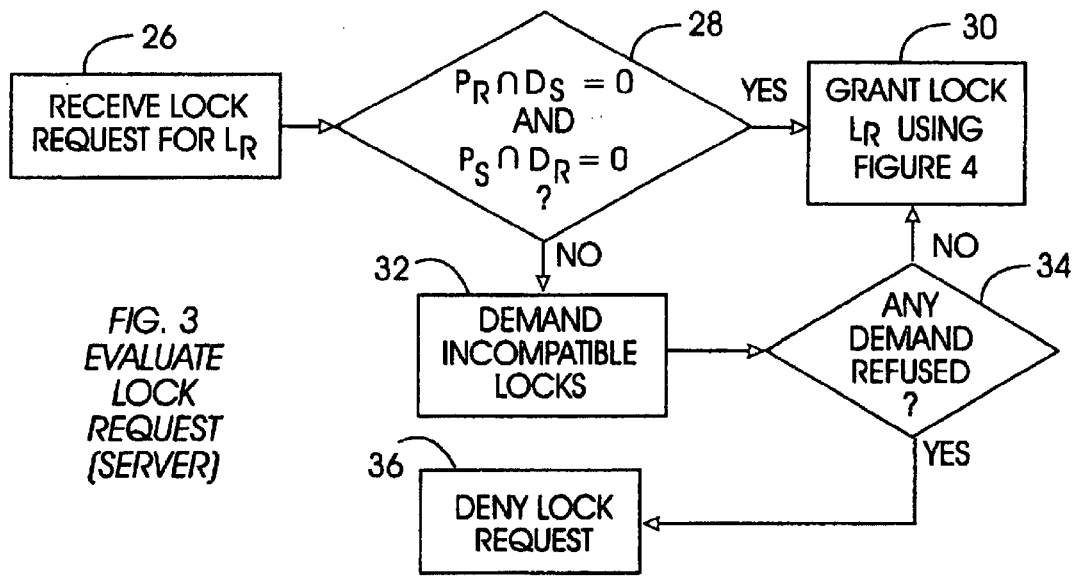
FIG. 3 is a flow chart showing the logic of the server in evaluating a requested access lock.

With the above principles in mind, FIG. 3 shows the server logic that is executed when a request for an access lock $L_R$ is received by the server. Commencing at block 24, the request is received, and then at decision diamond 28 the server determines whether the requested lock is compatible with all outstanding locks by undertaking the bitwise comparisons disclosed above between the requested lock and the summary string 16. If the requested lock is compatible, it is granted at block 30 using the logic of FIG. 4.

Figure 2:
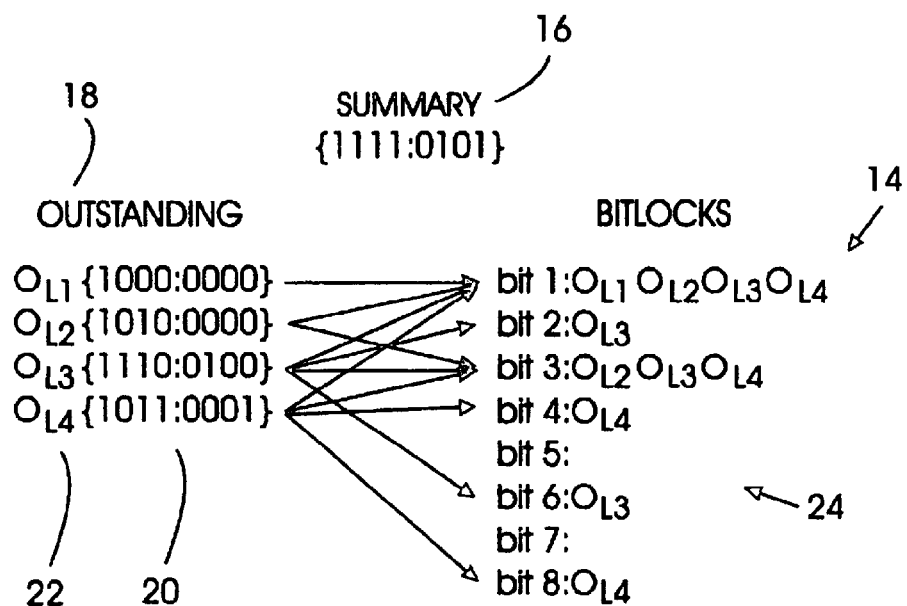
FIG. 2 is a table showing the preferred lock data structure.

On the other hand, if the requested lock is incompatible, outstanding incompatible locks are demanded at block 32 using the bitlock list 24 (FIG. 2). Specifically, for the "high" bits that caused the test at decision diamond 28 to fail, the locks identified in the bitlock list 24 for those bits are demanded.

Moving to decision diamond 34, it is determined whether any demands are refused by the client computers in the system 10. If not, the lock is granted at block 30; otherwise, the lock request is denied at block 36.

Figure 4:
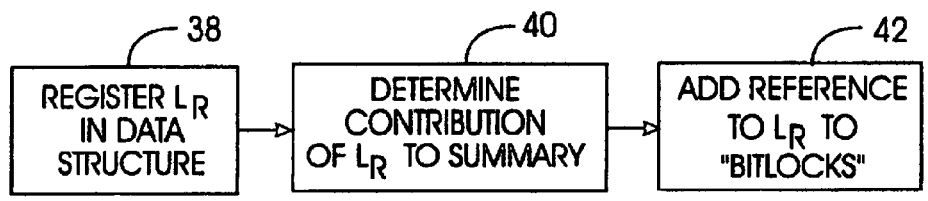
FIG. 4 is a flow chart showing the logic of the server in granting a requested access lock.

FIG. 4 shows that when a lock is granted, at block 38 it is registered in the data structure 14 by adding it to the list 18 of outstanding locks. Also, at block 40 the new lock's contribution to the summary string 16 is determined in accordance with the disclosure above, and the summary string 16 is updated accordingly. The requisite entries into the bitlocks list 24 for the new lock are then made at block 42. It is to be understood that when a lock is released, its entry in the outstanding list 18 is removed, all of its references in the bitlock list 24 are removed and, if an entry in the bitlock list 24 becomes empty as a result, the corresponding bit in the summary string 16 is set low.

Figure 5:
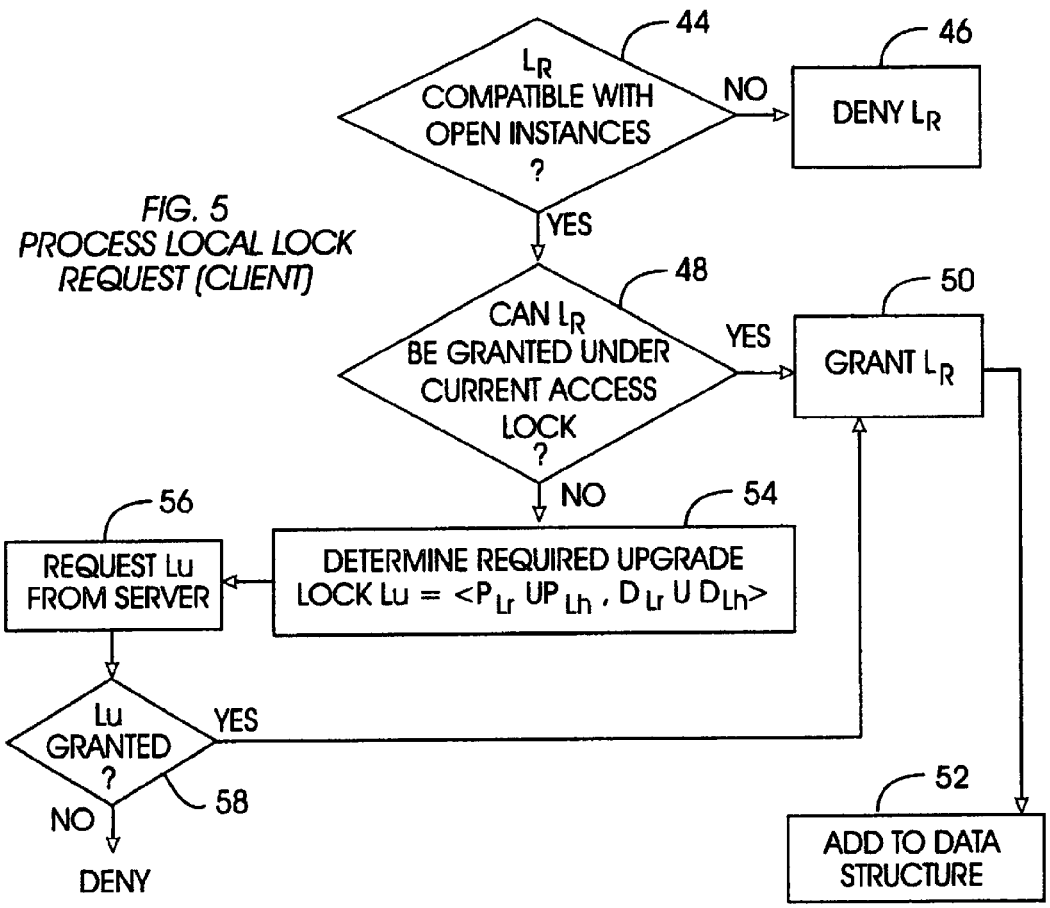
FIG. 5 is a flow chart showing the logic of a client in evaluating a requested local lock.
Figure 6:
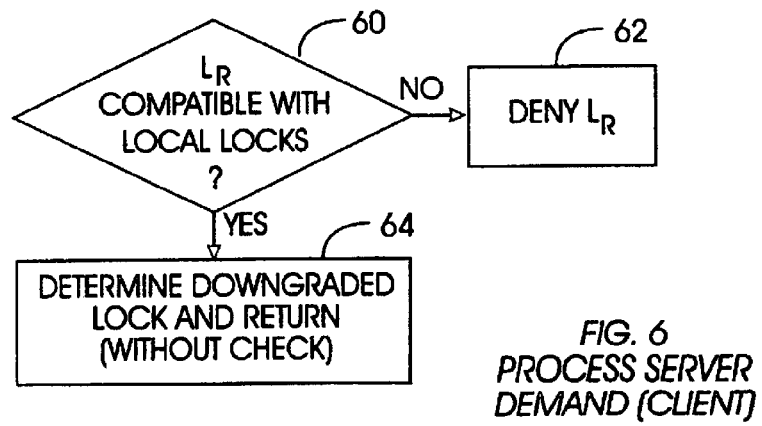
FIG. 6 is a flow chart showing the logic of a client in processing a server demand for an access lock.

In discussing the client-side algorithms of FIGS. 5 and 6, it is to be understood that lock upgrades and lock downgrades are treated as combinations of release and request. That is, an upgrade is treated as a release followed by a request for a stringer lock, (with the caveat that if the attempted upgrade fails the released lock is reinstated), while a downgrade is likewise a release followed by a request (but without checking outstanding locks) for a newer, weaker lock.

FIG. 5 shows the logic executed by a client computer when a local demand for a local lock $L_R$ is received from a process local to the client. It is to be appreciated that a client obtains an access lock from the server and under that access lock issues local locks as needed. It is to be further understood that each client maintains a data structure for its local locks that is similar to the system data structure 16 shown in FIG. 2 that is maintained by the system server.

First, at decision diamond 44 it is determined whether the requested lock $L_R$ is compatible with other local open instances, the modes of which are summarized in a local summary string. Thus, the above-disclosed compatibility equation is used with the summary string bits being embodied by the local summary. If the lock is not compatible with other open instances the request is denied at block 46.

If, however, the requested lock is compatible with other local open instances at the client, the logic moves to decision diamond 48 to determine whether the lock can be granted under the current access lock $L_H$ held by the client. In the preferred embodiment the following test is used. If $P_R \cap \neg P_H = 0 \wedge D_R \cap \neg D_H = 0$, the requested local lock $L_R$ can be granted under the held access lock $L_H$ at block 50. The lock is then added to the client's local data structure at block 52.

If it is determined, however, at decision diamond 48 that the lock cannot be granted under the current access lock $L_H$ held by the client, the logic moves to block 54 to determine the required access lock that must be upgraded to protect the requested local lock. To do this, the upgrade lock $L_U$ is determined as follows: $L_U = P_{Lr} \cup P_{Lh}$, $D_{Lr} \cup D_{Lh}$, i.e., the upgrade lock is represented by the union of the bits (that is, the protected modes and the concurrently restricted modes) of the currently held access lock $L_H$ and the requested local lock $L_R$. This upgrade lock is requested at block 56, with the server then processing the request as described above to grant or deny the upgrade lock $L_U$. If the upgrade access lock is granted at decision diamond 58, the local lock $L_R$ is granted at block 50; otherwise, it is denied at block 46.

FIG. 6 shows the logic of a client computer in processing a server demand for an access lock as might be required at block 32 in FIG. 3 pursuant to an access lock request. Commencing at decision diamond 60, it is determined whether the demanded lock $L_R$ is compatible with local locks using the above-disclosed compatibility algorithms. If not, the demand is denied at block 62.

On the other hand, if it is determined that the demanded lock $L_R$ is compatible with local locks using the above-disclosed compatibility algorithms, the logic proceeds to block 64 to determine a downgraded access lock $L_H$. Many tests can be used to downgrade a lock, and two extreme heuristics are presented herein. A MIN downgrade minimally decreases protected access to comply with the requested lock's sharing, and minimally increases sharing to allow requested locks protected access. In contrast, a MAX downgrade heuristic is used in highly shared environments to select the weakest adequate lock.

In the MIN downgrade, a downgraded version $L_H$ of a lock to be downgraded is selected that satisfies the following two equations: $L_H = <P_{Lh} \wedge \neg D_{Lr}$ and $D_{Lh} \wedge \neg P_{Lr}>$. On the other hand, in the MAX downgrade, the downgraded locking mode is exactly the system lock summary.

While the particular SYSTEM FOR DYNAMICALLY EVALUATING LOCKS IN A DISTRIBUTED DATA STORAGE SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer system, comprising:
   at least one general purpose server computer;
   at least one general purpose client computer;
   a distributed data storage system accessible to at least the client computer; and
   logic executable by the client computer for undertaking method acts to evaluate lock requests in the storage system, the method acts comprising:
   determining whether to grant a requested lock using at least one algorithm without using a lock compatibility table, the lock pertaining to at least one asset in the storage system.

2. The system of claim 1, wherein the determining act is undertaken by accessing a summary string of outstanding locks.

3. The system of claim 2, wherein the algorithm is based on respective sets of privileges granted by at least two locks, and on respective sets of sharing privileges restricted by the two locks.

4. The system of claim 3, wherein the summary string defines a first set $P_S$ of protected access modes and a first set $D_S$ of restricted access modes, and the requested lock defines a second set $P_R$ of protected access modes and a second set $D_R$ of restricted access modes, and the algorithm determines whether the intersection of at least one of: the first set $P_S$ of protected access modes and second set $D_R$ of restricted access modes, and the second set $P_R$ of protected access modes and first set $D_S$ of restricted access modes.

5. The system of claim 4, wherein the requested lock is granted if $(P_R \cap D_S=0)\widehat{\,}(P_S \cap D_R=0)$.

6. The system of claim 4, wherein an upgrade lock is determined that is represented by a union of outstanding and requested protected modes and outstanding and requested restricted modes.

7. A computer system, comprising:
  at least one general purpose server computer;
  at least first and second general purpose client computers;
  a distributed data storage system accessible to at least the client computers; and
  logic executable by the server computer for undertaking method acts to manage access to assets in the storage system, the method acts comprising:
  receiving a request for a first lock from the first client computer;
  determining at least whether the first lock is compatible with at least a second lock associated with the second client computer based on a bitwise evaluation of respective first and second sets of access privileges and sharing privileges associated with the first and second locks;
  granting the request if the first lock is compatible with the second lock; otherwise
  demanding the second lock.

8. The system of claim 7, wherein the determining act is undertaken by accessing a summary string of outstanding locks.

9. The system of claim 7, wherein the algorithm is based on respective sets of privileges granted by at least two locks, and on respective sets of sharing privileges restricted by the two locks.

10. The system of claim 8, wherein the first lock is a requested lock and the summary string defines a first set $P_S$ of protected access modes and a first set $D_S$ of restricted access modes, and the requested lock defines a second set $P_R$ of protected access modes and a second set $D_R$ of restricted access modes, and the algorithm determines whether the intersection of at least one of: the first set $P_S$ of protected access modes and second set $D_R$ of restricted access modes, and the second set $P_R$ of protected access modes and first set $D_S$ of restricted access modes.

11. The system of claim 10, wherein the requested lock is granted if $(P_R \cap D_S=0)\widehat{\,}(P_S \cap D_R=0)$.

12. A computer program device comprising:
  a computer program storage device readable by a client computer; and
  a program on the program storage device and including instructions executable by the client computer for evaluating a request for a requested lock, the program comprising:
  computer readable code means for determining whether to grant the requested lock without using a lock compatibility table, the requested lock pertaining to at least one asset in the storage system.

13. The device of claim 12, wherein the means for determining uses an algorithm based on respective sets of privileges granted by at least two locks, and on respective sets of sharing privileges restricted by the two locks.

14. The device of claim 13, wherein a summary string defines a first set $P_S$ of protected access modes and a first set $D_S$ of restricted access modes, and the requested lock defines a second set $P_R$ of protected access modes and a second set $D_R$ of restricted access modes, and the algorithm determines whether the intersection of at least one of: the first set $P_S$ of protected access modes and second set $D_R$ of restricted access modes, and the second set $P_R$ of protected access modes and first set $D_S$ of restricted access modes.

15. The device of claim 14, wherein the requested lock is granted if $(P_R \cap D_S=0)\widehat{\,}(P_S \cap D_R=0)$.

16. A computer-implemented method for managing access among plural client computers to assets in a distributed data storage system associated with at least one server computer, comprising the acts of:
  issuing locks to client computers, the locks being conditions precedent for the grant of a file lock to open a file, the locks being relinquished upon demand of the server computer when no associated file lock is invoked, the issuing act being based on at least one of: first and second sets of access privileges pertaining to first and second locks, respectively, and first and second sets of sharing privileges restricted by the first and second locks, respectively.

17. The method of claim 16, further comprising the act of:
  combining one or more of the sets in an equation, to undertake the issuing act.

18. The method of claim 17, wherein the equation determines compatibility if $(P_R \cap D_S=0)\widehat{\,}(P_S \cap D_R=0)$.

* * * * *